(12) United States Patent
Choi et al.

(10) Patent No.: US 12,091,347 B2
(45) Date of Patent: Sep. 17, 2024

(54) GLASS ARTICLE AND METHOD OF MANUFACTURING THE SAME

(71) Applicant: Samsung Display Co., LTD., Yongin-si (KR)

(72) Inventors: Beomgyu Choi, Seoul (KR); Jaeseung Jeon, Hwaseong-si (KR); Eunyoung Cho, Seoul (KR); Jinsoo Shin, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/869,102

(22) Filed: Jul. 20, 2022

(65) Prior Publication Data

US 2023/0135503 A1  May 4, 2023

(30) Foreign Application Priority Data

Oct. 29, 2021 (KR) .......................... 10-2021-0146852

(51) Int. Cl.
*C03B 23/03* (2006.01)
*C03C 21/00* (2006.01)

(52) U.S. Cl.
CPC ........ *C03B 23/0307* (2013.01); *C03C 21/002* (2013.01)

(58) Field of Classification Search
CPC ............ C03B 23/0307; C03B 33/0222; C03C 21/002; C03C 3/093; C03C 3/064; C03C 3/066; C03C 3/078; C03C 3/083; C03C 3/085; C03C 3/087; C03C 3/089; C03C 3/091; C03C 15/00; B32B 3/266; B32B 17/10; B32B 2250/03; B32B 2250/40; B32B 2457/20
See application file for complete search history.

(56) References Cited

U.S. PATENT DOCUMENTS

2021/0108077 A1  4/2021  Berleue et al.
2021/0216100 A1*  7/2021  Smeeton ............... G06F 1/1652

FOREIGN PATENT DOCUMENTS

| KR | 10-2017-0035405 | 3/2017 |
| KR | 10-2021-0069776 | 6/2021 |
| KR | 10-2264217 | 6/2021 |
| WO | WO-2022177797 A1 * | 8/2022 |

* cited by examiner

*Primary Examiner* — Alicia J Weydemeyer
*Assistant Examiner* — Laura B Figg
(74) *Attorney, Agent, or Firm* — KILE PARK REED & HOUTTEMAN PLLC (57) ABSTRACT

A glass article includes a first portion having a flat surface, a second portion spaced apart from the first portion, the second portion having a flat surface and a foldable portion disposed between the first portion and the second portion, elastically deformed by an external force, and having a curved surface in a neutral state in which the glass article is not elastically deformed.

10 Claims, 6 Drawing Sheets

GLASS ARTICLE AND METHOD OF MANUFACTURING THE SAME

CROSS-REFERENCE TO RELATED APPLICATION(S)

This application claims priority to and benefits of Korean Patent Application No. 10-2021-0146852 under 35 U.S.C. § 119 filed on Oct. 29, 2021 in the Korean Intellectual Property Office, the entire contents of which are incorporated herein by reference.

BACKGROUND

1. Technical Field

Embodiments relate to a glass article for a foldable display device and a method of manufacturing the same.

2. Description of the Related Art

A glass article may be used in an electronic device including a display device. For example, since the glass article may have a relatively high rigidity, the glass article may be applied to a substrate of a display device, a cover window for protecting the display device, etc., for example.

Recently, a foldable display device which can be repeatedly folded or unfolded has been in the spotlight. Accordingly, there is a growing need for a glass article having a flexibility to be repeatedly folded or unfolded.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a glass article having a relatively high rigidity and relatively high flexibility.

Embodiments provide a method of manufacturing the glass article.

Additional features will be set forth in the description which follows, and in part will be apparent from the description, or may be learned by practice of the embodiments.

An embodiment of a glass article may include a first portion having a flat surface; a second portion spaced apart from the first portion, the second portion having a flat surface; and a foldable portion disposed between the first portion and the second portion, elastically deformed by an external force, and having a curved surface in a neutral state in which the glass article is not elastically deformed.

In an embodiment, the foldable portion may have a first radius of curvature in the neutral state.

In an embodiment, an angle between the first portion and the second portion may be greater than or equal to about 60° and less than or equal to about 120° in the neutral state.

In an embodiment, the foldable portion may be elastically deformed in a folded state in which the first portion and the second portion face each other.

In an embodiment, the foldable portion may be elastically deformed in an unfolded state in which the first portion and the second portion are parallel to each other.

In an embodiment, a thickness of the first portion, a thickness of the second portion, and a thickness of the foldable portion may be equal to each other in the unfolded state.

In an embodiment, a thickness of the first portion, a thickness of the second portion, and a thickness of the foldable portion may be greater than or equal to about 0.01 mm and less than or equal to about 0.2 mm in the unfolded state.

In an embodiment, the foldable portion may have a flat surface in the unfolded state.

In an embodiment, at least a portion of the first portion, at least a portion of the second portion, and at least a portion of the foldable portion may be chemically strengthened.

An embodiment of a method of manufacturing a glass article may include bending a glass substrate having a flat surface and forming a first portion having a flat surface, a second portion having a flat surface and spaced apart from the first portion, and a foldable portion disposed between the first portion and the second portion, and applying heat to the glass substrate and plastically deforming the glass substrate.

In an embodiment, the foldable portion may have a first radius of curvature.

In an embodiment, a thickness of the glass substrate may be greater than or equal to about 0.01 mm and less than or equal to about 0.2 mm.

In an embodiment, the bending of the glass substrate may include disposing the glass substrate having the flat surface on a lower plate having a first surface corresponding to the first portion of the glass substrate, a second surface corresponding to the second portion of the glass substrate, and a third surface corresponding to the foldable portion of the glass substrate; and pressing the glass substrate by moving an upper plate facing the lower plate.

In an embodiment, the third surface may have a first radius of curvature.

In an embodiment, the heat applied to the glass substrate may be greater than or equal to about 400° C. and less than or equal to about 900° C.

In an embodiment, the method of manufacturing a glass article may further include chemically strengthening the glass substrate after the applying of the heat to the glass substrate.

In an embodiment, the chemically strengthening of the glass substrate may include forming a reinforcement layer on a surface of the glass substrate by precipitating the glass substrate in a solution.

In an embodiment, the solution may include a potassium nitride.

In an embodiment, the forming of the reinforcement layer on the surface of the glass substrate may include exchanging a first ion disposed in the surface of the glass substrate with a second ion contained in the solution by heating the solution.

In an embodiment, an ionic radius of the first ion may be smaller than an ionic radius of the second ion.

A glass article according to embodiments may include a foldable portion having a curved surface in a neutral state in which the glass article is not elastically deformed. Accordingly, in case that the glass article is elastically deformed, a magnitude of stress that the glass article receives may be relatively small.

A method of manufacturing the glass article according to embodiments may include bending a glass substrate having a flat surface to form a foldable portion having a curved surface, and plastically deforming the glass substrate by applying heat to the glass substrate. Accordingly, in case that the glass article is elastically deformed, a magnitude of the stress that the glass article receives may be relatively small.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the embodiments.

DETAILED DESCRIPTION OF THE EMBODIMENTS

The disclosure will now be described more fully hereinafter with reference to the accompanying drawings, in which various embodiments are shown. This disclosure may, however, be embodied in many different forms, and should not be construed as limited to the embodiments set forth herein. Rather, these embodiments are provided so that this disclosure will be thorough and complete, and will fully convey the scope of the disclosure to those skilled in the art.

Like reference numerals refer to like elements throughout. As used herein, a reference number may indicate a singular element or plural elements. For example, a reference number labeling a singular form of an element within the drawing figures may be used to reference plural of the singular element within the text of the specification.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Illustrative, non-limiting embodiments will be more clearly understood from the following detailed description in conjunction with the accompanying drawings.

Figure 1:
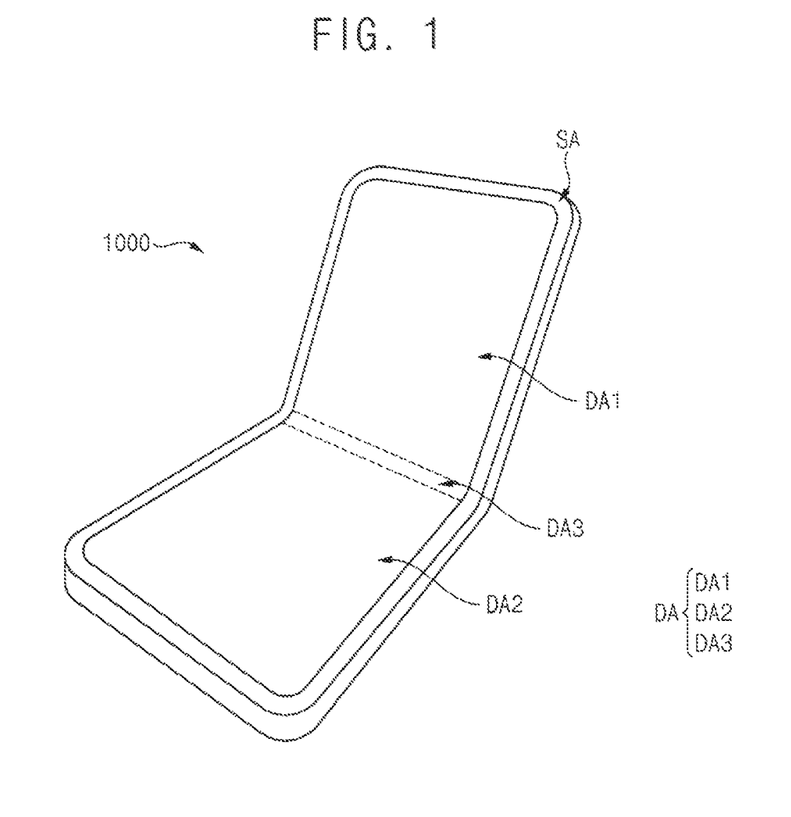
FIG. 1 is a schematic perspective view illustrating a foldable display device according to an embodiment.

FIG. 1 is a schematic perspective view illustrating a foldable display device according to an embodiment.

Referring to FIG. 1, a foldable display device 1000 may include a display area DA and a peripheral area SA.

The display area DA may be an area displaying an image. In an embodiment, a user of the foldable display device 1000 may operate the foldable display device 1000 by touching the display area DA. In an embodiment, the display area DA may include a first display area DA1, a second display area DA2, and a foldable display area DA3.

The first display area DA1 may have a substantially flat surface. The second display area DA2 may be spaced apart from the first display area DA1 and may have a substantially flat surface. In the foldable display area DA3, the foldable display device 1000 may be repeatedly folded or unfolded.

The peripheral area SA may surround the display area DA or may be adjacent to the display area DA. A driver for driving pixels disposed in the display area DA may be disposed in the peripheral area SA. In an embodiment, the peripheral area SA may be omitted. The driver may be disposed in the display area DA.

Figure 2:
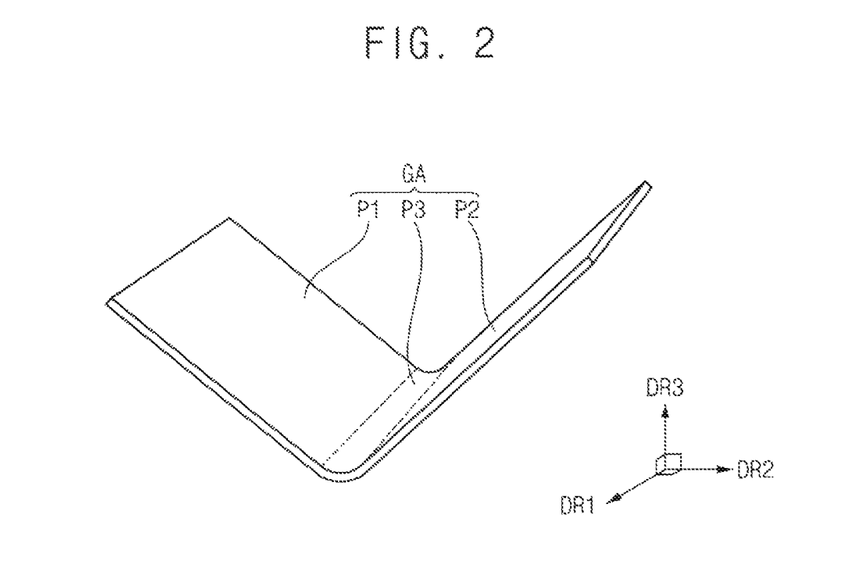
FIG. 2 is a schematic perspective view illustrating a glass article included in the foldable display device of FIG. 1.

FIG. 2 is a schematic perspective view illustrating a glass article included in the foldable display device of FIG. 1.

Referring to FIG. 2, a glass article GA may include a first portion P1, a second portion P2, and a foldable portion P3.

The first portion P1 may have a substantially flat surface. The first portion P1 may correspond to the first display area DA1 of the foldable display device 1000. In an embodiment, the first portion P1 may be disposed to cover or to overlap the first display area DA1 of the foldable display device 1000, and accordingly, the first portion P1 may protect the first display area DA1 of the foldable display device 1000.

The second portion P2 may be spaced apart from the first portion P1. The second portion P2 may have a substantially flat surface. The second portion P2 may correspond to the second display area DA2 of the foldable display device 1000.

The foldable portion P3 may be positioned between the first portion P1 and the second portion P2. The foldable portion P3 may correspond to the foldable display area DA3 of foldable display device 1000. Since the foldable display device 1000 may be repeatedly folded or unfolded in the foldable display area DA3, the foldable portion P3 may be flexible to be repeatedly folded or unfolded. In other words, the foldable portion P3 may be elastically deformed by an external force. Also, the foldable portion P3 may protect the foldable display area DA3 of the foldable display device 1000.

In an embodiment, at least a portion of the first portion P1, at least a portion of the second portion P2, and at least a portion of the foldable portion P3 may be chemically strengthened. By chemically strengthening, rigidity of the glass article GA may be relatively increased. The chemical strengthening will be described later with reference to FIG. 8 and FIG. 9.

Figure 3:
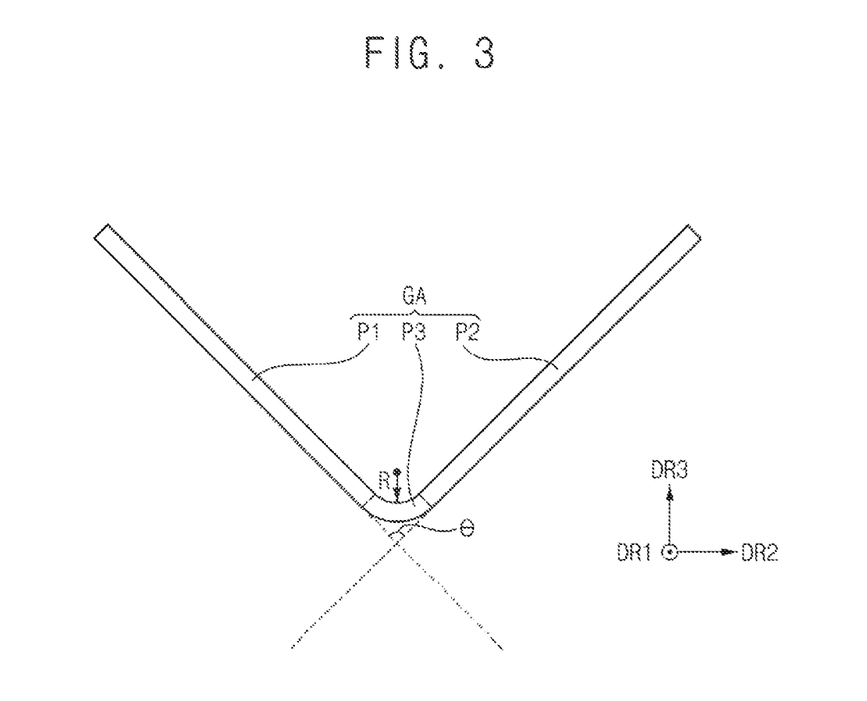
FIG. 3 is a schematic diagram illustrating a state in which the glass article of FIG. 2 is not elastically deformed.

FIG. 3 is a schematic diagram illustrating a state in which the glass article of FIG. 2 is not elastically deformed. FIG. 3 is a schematic diagram illustrating a glass article GA of FIG. 2 as viewed from a first direction DR1. It is to be understood that FIG. 3 further includes a second direction DR2 and a third direction DR3 of which the first, second and third directions may be substantially perpendicular to each other.

Referring to FIG. 3, in an embodiment, in a state in which the external force is not applied to the glass article GA, the foldable portion P3 may have a curved shape or a substantially curved shape. The state in which the external force is not applied to the glass article GA (for example, the state in which the glass article GA is not elastically deformed) may be referred to as a neutral state.

In an embodiment, in the neutral state, the foldable portion P3 may have a first radius of curvature R. Accordingly, in the neutral state, the first portion P1 and the second portion P2 may form an angle θ.

In an embodiment, in the neutral state, the angle θ between the first portion P1 and the second portion P2 may be greater than or equal to about 60° and less than or equal to about 120°. For example, the angle θ between the first portion P1 and the second portion P2 may be greater than or equal to about 80° and less than or equal to about 100°. In case that the size of the angle θ between the first part P1 and the second part P2 is about 60° or more and about 120° or less, magnitude of a stress applied to the foldable portion P3 may be relatively reduced. In other words, in case that the glass article GA is elastically deformed between a folded state (see FIG. 4) and an unfolded state (see FIG. 5), magnitude of the stress applied to the foldable portion P3 may be relatively reduced.

Figure 4:
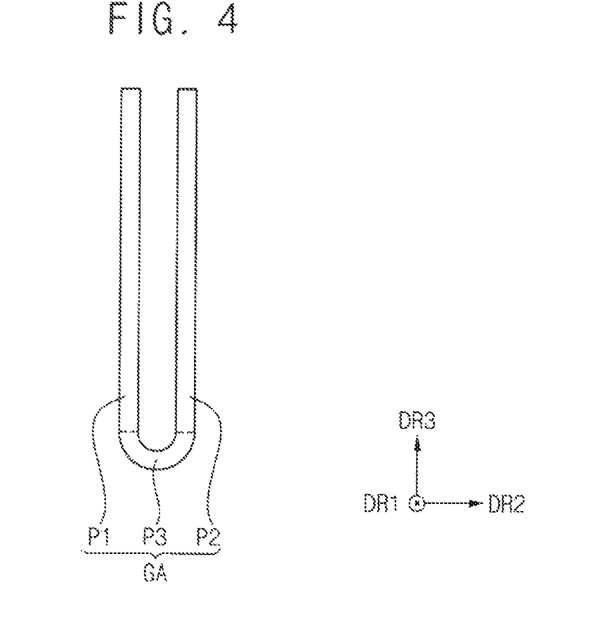
FIG. 4 and FIG. 5 are schematic diagrams illustrating various states in which the glass article of FIG. 2 is elastically deformed.
Figure 5:
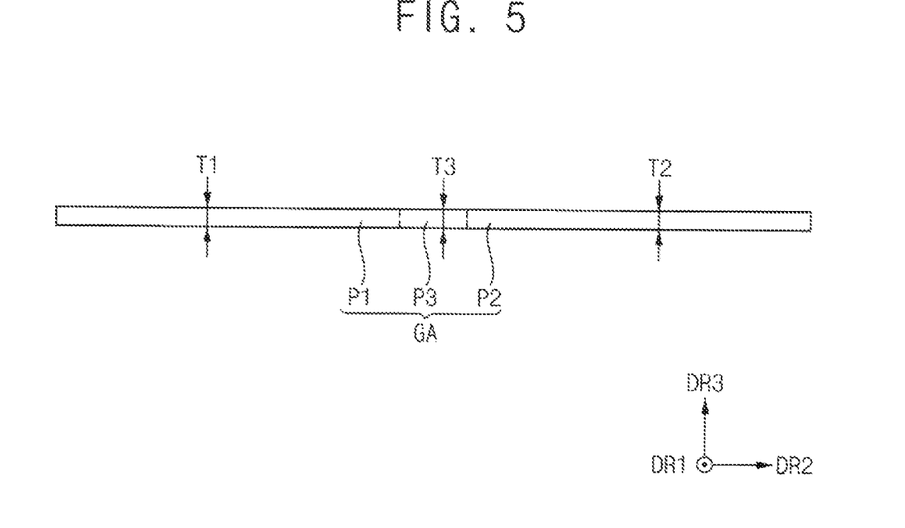

FIG. 4 and FIG. 5 are schematic diagrams illustrating various states in which the glass article of FIG. 2 is elastically deformed.

Referring to FIG. 4, the foldable portion P3 may be elastically deformed in a state in which the first portion P1 and the second portion P2 face each other by the external force. The state in which the first portion P1 and the second portion P2 face each other may be referred to as the folded state.

Referring to FIG. 5, the foldable portion P3 may be elastically deformed in a state in which the first portion P1 and the second portion P2 are parallel to each other by the external force. The state in which the first part P1 and the second part P2 are parallel to each other may be referred to as the unfolded state. In the unfolded state, the foldable portion P3 may have a substantially flat surface.

In an embodiment, a thickness T1 of the first portion P1, a thickness T2 of the second portion P2, and a thickness T3 of the foldable portion P3 may be substantially the same. In the glass article GA of the disclosure, even if the thickness T3 of the foldable portion P3 is not less than the thickness T1 of the first portion P1 or the thickness T2 of the second portion P2, magnitude of the stress applied to the foldable portion P3 may be relatively small in case that the glass article GA is elastically deformed. In case that the thickness T3 of the foldable portion P3 is substantially the same as the thickness T1 of the first portion P1 and the thickness T2 of the second portion P2, a rigidity of the foldable portion P3 may be substantially the same as each of a rigidity of the first portion P1 and a rigidity of the second portion P2.

In an embodiment, the thickness T1 of the first portion P1, the thickness T2 of the second portion P2, and the thickness T3 of the foldable portion P3 may be about 0.01 mm or more and about 0.2 mm or less. In case that the thickness T1 of the first portion P1, the thickness T2 of the second portion P2, and the thickness T3 of the foldable portion P3 are less than about 0.01 mm, the rigidity of the first portion P1, the rigidity of the second portion P2, and the rigidity of the foldable portion P3 may be relatively small, so the glass article GA may be damaged by the user's touch of the foldable display device 1000. In case that the thickness T1 of the first portion, the thickness T2 of the second portion P2, and the thickness T3 of the foldable portion P3 is larger than about 0.2 mm, a flexibility of the foldable portion P3 may be relatively small. The glass article GA may be relatively readily damaged due to repeated folding or unfolding of the foldable display device 1000.

FIG. 6, FIG. 7, FIG. 8, and FIG. 9 are schematic diagrams illustrating a method of manufacturing the glass article according to an embodiment.

Figure 6:
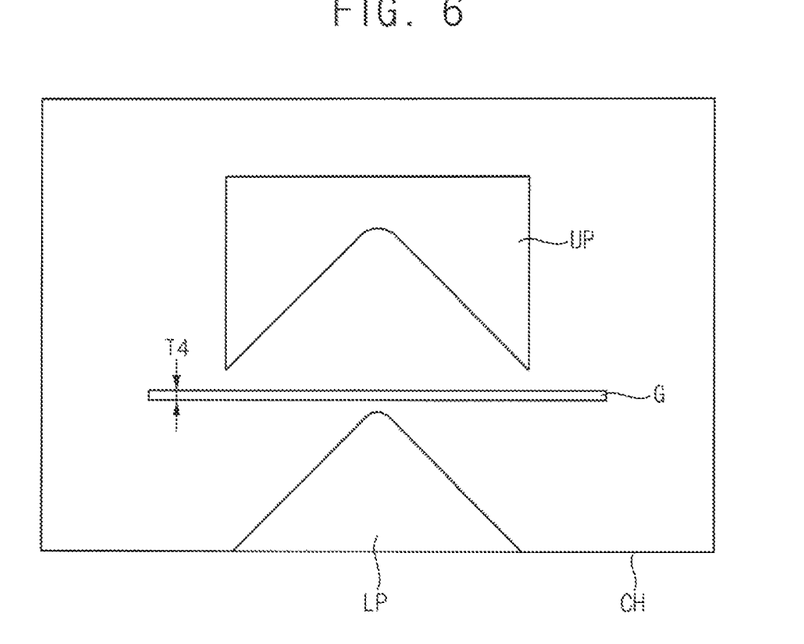
FIG. 6, FIG. 7, FIG. 8, and FIG. 9 are schematic diagrams illustrating a method of manufacturing the glass article according to an embodiment.
Figure 7:
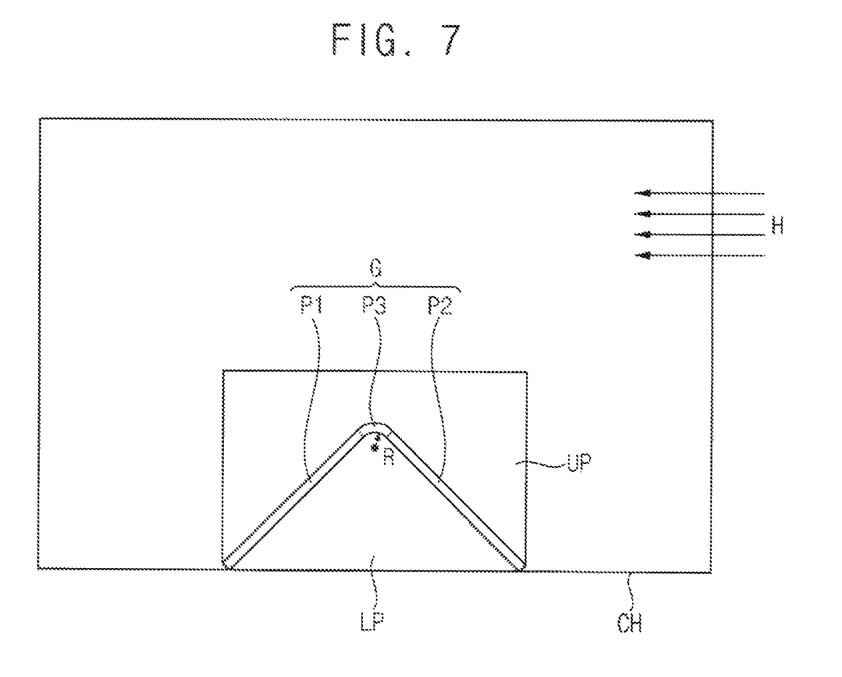

Referring to FIG. 6 and FIG. 7, a glass substrate G may be bent. The glass substrate G may have a substantially flat surface. In an embodiment, a thickness of the glass substrate G may be about 0.01 mm or more and about 0.2 mm or less.

In an embodiment, after disposing the glass substrate G on a lower plate LP, by moving an upper plate UP facing the lower plate LP to press the glass substrate G, the glass substrate G may be bent.

A curved glass substrate G may include a first portion P1 having a substantially flat surface, a second portion P2 spaced apart from the first portion P1, and a foldable portion P3 positioned between the first portion P1 and the second portion P2 and having a curved surface.

The lower plate LP may include a first surface corresponding to the first portion P1, a second surface corresponding to the second portion P2, and a third surface corresponding to the foldable portion P3.

In an embodiment, the third surface may have a first radius of curvature R. Accordingly, the foldable portion P3 may have the first radius of curvature R.

Referring again to FIG. 7, by applying heat H to the curved glass substrate G, the curved glass substrate G may be plastic deformation.

In an embodiment, bending the glass substrate and applying heat H to the curved glass substrate G may be performed in the chamber CH. The chamber CH may be insulated from an external environment.

In an embodiment, the heat H may be greater than or equal to about 400° C. and less than or equal to about 900° C.

Figure 8:
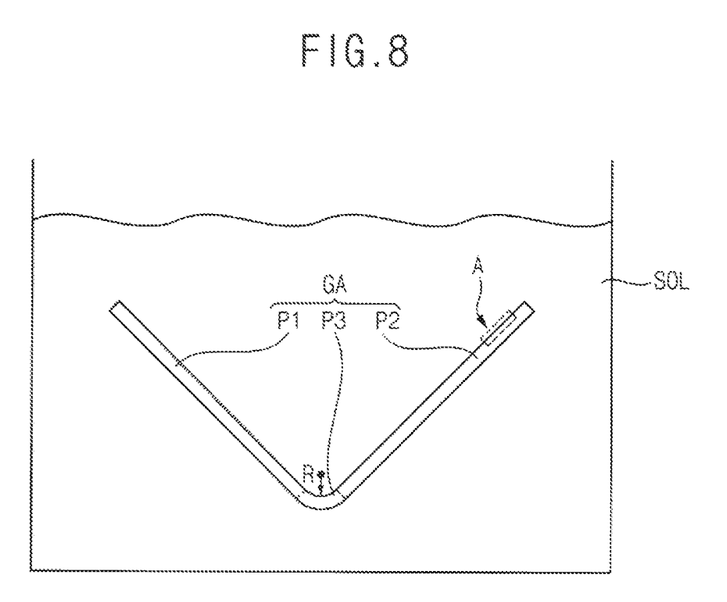

Referring to FIG. 8, a plastic deformed glass substrate G may be subjected to chemical strengthening treatment.

In an embodiment, the chemical strengthening treatment may include forming a reinforcement layer on a surface of the glass substrate G by precipitating the glass substrate G in a solution SOL.

The reinforcement layer may be defined as an area of the surface of the glass substrate G in which a first ion disposed in the surface of the glass substrate G is exchanged with a second ion included in the solution SOL. This will be described later in detail with reference to FIG. 9.

Figure 9:
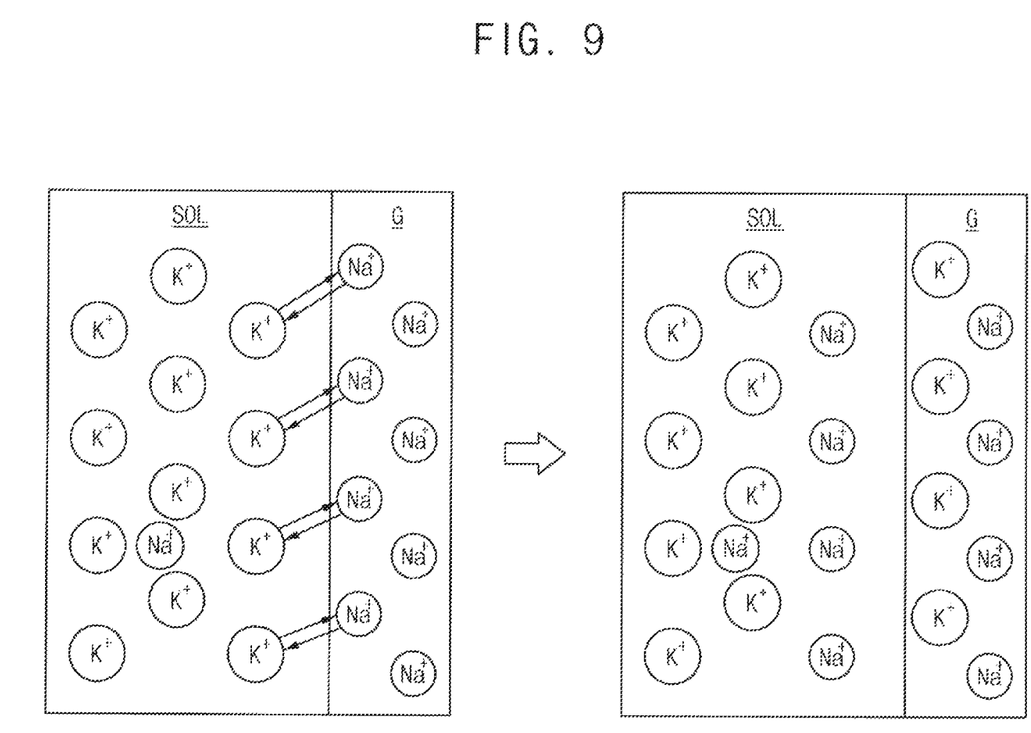

Referring to FIG. 9, FIG. 9 is a schematic diagram illustrating a process in which ion exchange occurs between the surface of the glass substrate G and the solution SOL in a region A of FIG. 8.

The first ion may be disposed in the surface of the glass substrate G. The solution SOL may include the second ion. An ionic radius of the first ion may be smaller than an ionic radius of the second ion. In an embodiment, the first ion may be a sodium ion, and the second ion may be a potassium ion. In case that the second ion is a potassium ion, the solution SOL may include potassium nitrate.

In case that the solution SOL is heated after precipitating the glass substrate G in the solution SOL, the first ion disposed in the surface of the glass substrate G may be exchanged with the second ion. The ionic radius of the second ion may be greater than the ionic radius of the first ion, and accordingly, a rigidity of the surface of the glass substrate G may be relatively increased.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A glass article, comprising:
   a first portion having a flat surface;
   a second portion spaced apart from the first portion, the second portion having a flat surface; and
   a foldable portion disposed between the first portion and the second portion, the foldable portion configured to elastically deform by an external force, wherein
   the foldable portion has a curved surface in a neutral state, the neutral state being when the external force is not applied to the glass article, and
   an angle between the first portion and the second portion is less than or equal to 120° in the neutral state.

2. The glass article of claim 1, wherein the foldable portion has a first radius of curvature in the neutral state.

3. The glass article of claim 1, wherein an angle between the first portion and the second portion is greater than or equal to about 60° in the neutral state.

4. The glass article of claim 1, wherein the foldable portion is elastically deformed in a folded state in which the first portion and the second portion face each other.

5. The glass article of claim 1, wherein the foldable portion is elastically deformed in an unfolded state in which the first portion and the second portion are parallel to each other in response to the external force.

6. The glass article of claim 5, wherein a thickness of the first portion, a thickness of the second portion, and a thickness of the foldable portion are equal to each other in the unfolded state.

7. The glass article of claim 6, wherein a thickness of the first portion, a thickness of the second portion, and a thickness of the foldable portion are greater than or equal to about 0.01 mm and less than or equal to about 0.2 mm in the unfolded state.

8. The glass article of claim 5, wherein the foldable portion has a flat surface in the unfolded state.

9. The glass article of claim 1, wherein at least a portion of the first portion, at least a portion of the second portion, and at least a portion of the foldable portion are chemically strengthened.

10. The glass article of claim 1, wherein an angle between the first portion and the second portion is greater than or equal to about 80° and less than or equal to 100° in the neutral state.

* * * * *